United States Patent
Fontijn

(10) Patent No.: US 8,493,180 B2
(45) Date of Patent: Jul. 23, 2013

(54) RADIO SYSTEM FOR SENSING APPLICATIONS

(75) Inventor: Wilhelmus F. J. Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1907 days.

(21) Appl. No.: 11/568,632

(22) PCT Filed: May 4, 2005

(86) PCT No.: PCT/IB2005/051469
§ 371 (c)(1),
(2), (4) Date: Nov. 3, 2006

(87) PCT Pub. No.: WO2005/109670
PCT Pub. Date: Nov. 17, 2005

(65) Prior Publication Data
US 2007/0222582 A1 Sep. 27, 2007

(30) Foreign Application Priority Data
May 6, 2004 (GB) .................................. 0410090.5

(51) Int. Cl.
*H04Q 5/22* (2006.01)
*G08B 13/14* (2006.01)

(52) U.S. Cl.
USPC ...... 340/10.1; 340/10.3; 340/10.5; 340/572.1

(58) Field of Classification Search
USPC ............ 340/10.1–10.5, 572.1, 568.1; 342/42; 714/25; 324/207.17
See application file for complete search history.

(56) References Cited

U.S. PATENT DOCUMENTS

| | | | |
|---|---|---|---|
| 3,713,092 A | 1/1973 | Ivenbaum | |
| 5,446,447 A | 8/1995 | Carney et al. | |
| 5,604,485 A | 2/1997 | Lauro et al. | |
| 5,606,323 A | 2/1997 | Heinrich et al. | |
| 5,680,106 A | 10/1997 | Schrott et al. | |
| 6,008,727 A * | 12/1999 | Want et al. | 340/572.1 |
| 6,104,311 A | 8/2000 | Lastinger | |
| 6,176,425 B1 * | 1/2001 | Harrison et al. | 235/385 |
| 6,253,161 B1 | 6/2001 | Arias-Estrada | |
| 6,342,830 B1 * | 1/2002 | Want et al. | 340/10.1 |
| 6,522,129 B2 * | 2/2003 | Miyata et al. | 324/207.17 |
| 6,600,418 B2 * | 7/2003 | Francis et al. | 340/572.1 |
| 6,622,567 B1 | 9/2003 | Hamel et al. | |
| 6,753,783 B2 * | 6/2004 | Friedman et al. | 340/573.7 |
| 6,784,789 B2 * | 8/2004 | Eroglu et al. | 340/10.6 |

(Continued)

FOREIGN PATENT DOCUMENTS

| | | |
|---|---|---|
| DE | 3922556 A1 | 1/1991 |
| JP | 2001018748 | 1/2001 |

*Primary Examiner* — Nam V Nguyen
(74) *Attorney, Agent, or Firm* — Leydig, Voit & Mayer, Ltd.

(57) ABSTRACT

A radio system for sensing the spatial configuration of a physical object comprising a transmitter (102) which sends a query message to a transponder (104) having at least one antenna (106). A radio frequency shield (108) is moveably interposable between the transmitter and one or more antennas and thereby attenuates the signal strength of the query message received at an antenna. In any state of spatial configuration of the physical object, the transponder is able to receive the query message and, in reply, send a response message containing data determined according to the signal strength of the query message received at the one or more antennas.

12 Claims, 5 Drawing Sheets

U.S. PATENT DOCUMENTS 7,098,794 B2 * 8/2006 Lindsay et al. ............ 340/572.3
7,701,346 B2 * 4/2010 Lindsay et al. ............ 340/572.3
2002/0107679 A1 8/2002 Roelofs
2003/0080862 A1 5/2003 Kranz

* cited by examiner

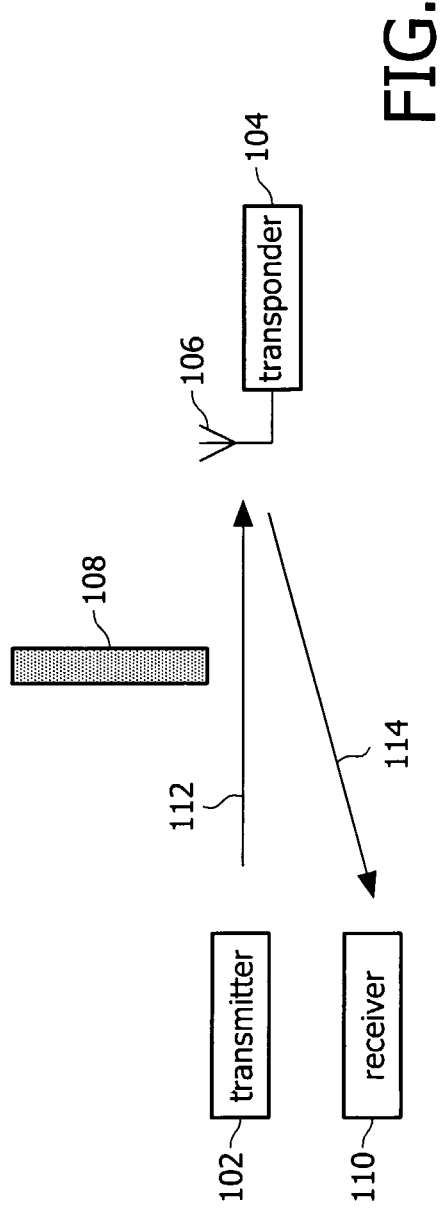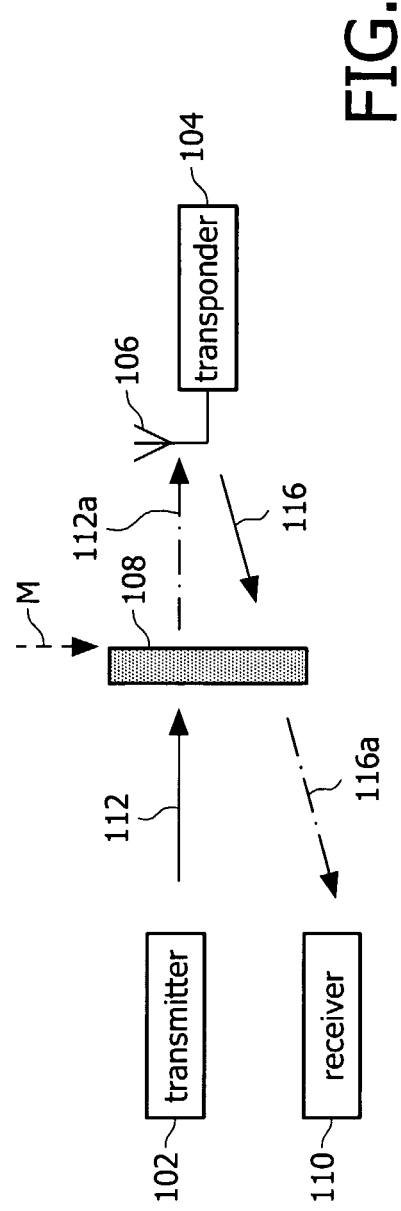

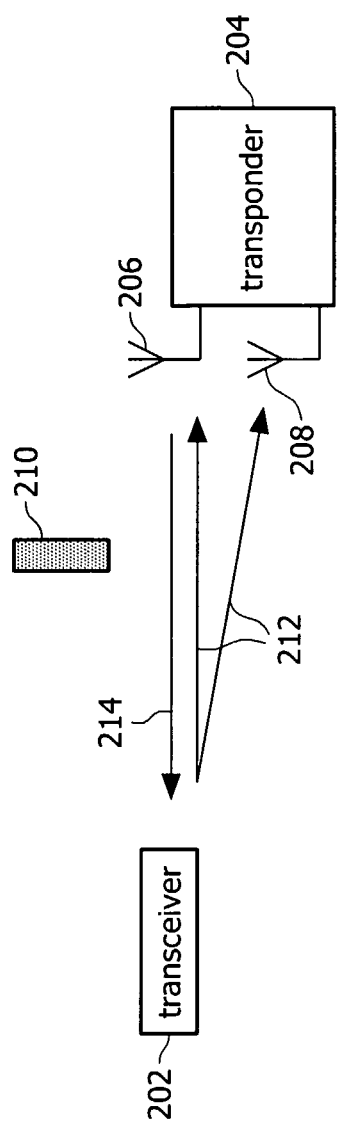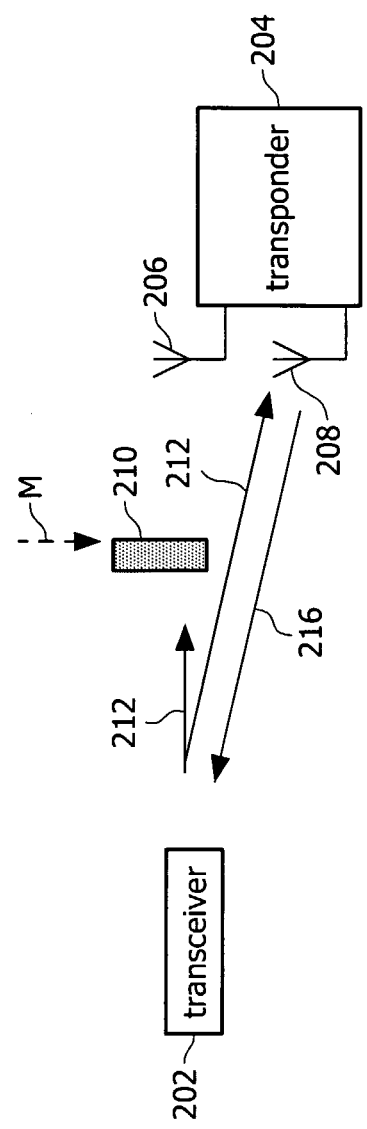

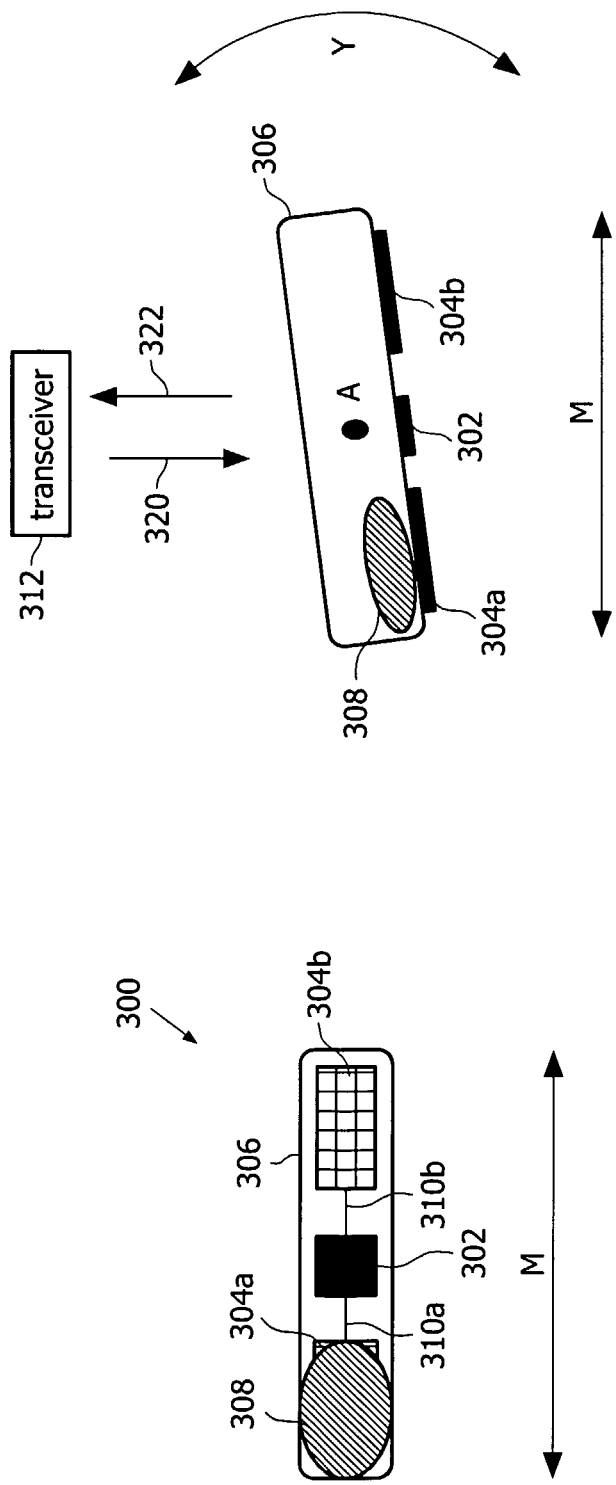

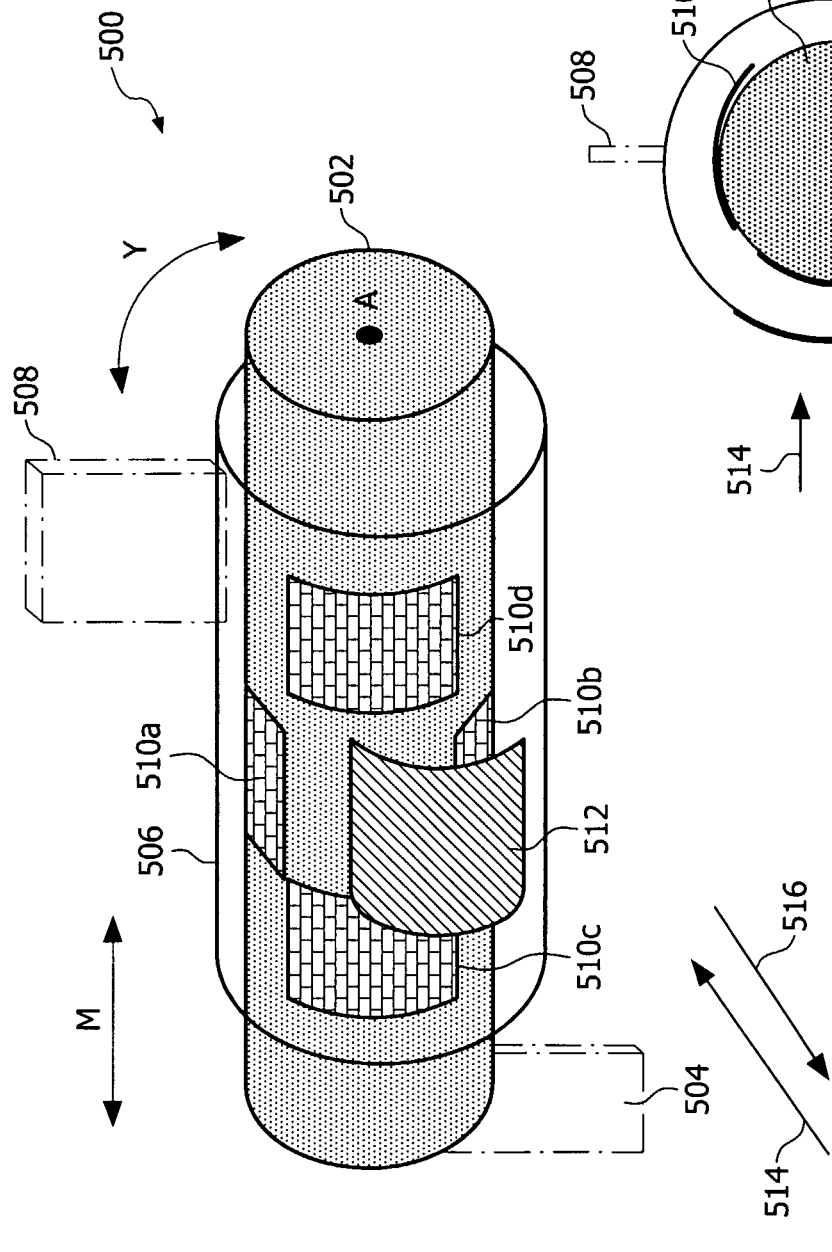
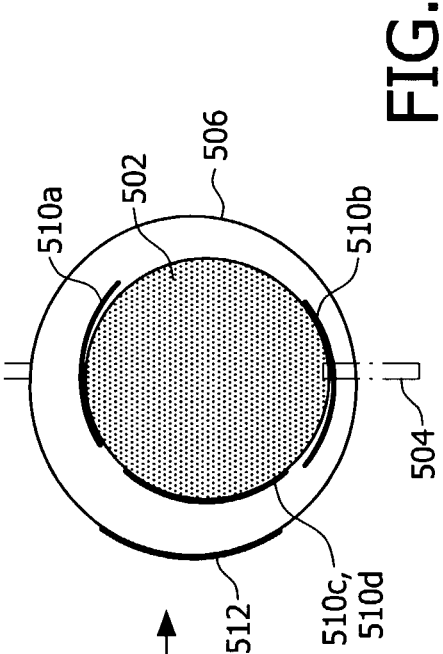
FIG. 5a
FIG. 5b

RADIO SYSTEM FOR SENSING APPLICATIONS

The present invention relates to radio systems suitable for sensing applications, in particular for the determination of spatial configuration of a physical object in one or more dimensions.

The state of a physical object with regard to a frame of reference is characterized by its position and its orientation with respect to this frame of reference. If the physical object is not rigid, but has multiple components that are moveable relative to one another, the object's state is in addition characterized by the object's spatial configuration, i.e., the relative positions and orientations of the components. A sensor for determining the object's state facilitates implementation of state-dependent operations. For example, an actuator in a servo-mechanism brings about a transition from a current state to a desired state under control of the sensor in a feedback loop.

A wide variety of position sensors and orientation sensors are known. For example, a mercury switch (a small tube partially filled with mercury that shorts an electric circuit) or a gyroscope is used to determine orientation with regard to gravity or with regard to a direction of acceleration.

A further example is the use of optical sensing, for example the use of a toothed wheel on a rotatable shaft to interrupt a light path between a light source and photodetector when the shaft is rotated. Disadvantages of this and many other prior art sensors is that a power supply and signal wiring is necessary for the detector (e.g. the photodetector), together with associated contact means to access output signals from the sensor. Furthermore, some sensors require additional mechanical means (such as the toothed wheel) which means may be provided solely for the purpose of sensing rotation, thereby adding cost, weight and physical volume to the host product.

In Japanese patent application JP 2001-018748 a buckle device for a vehicle occupant seat belt is disclosed in which a transceiver and a transponder are disposed oppositely to each other across a passage inside the buckle device. A metallic shield plate is slidably disposed within the passage such that when the tongue plate of the seat belt is not inserted, transmission and reception of electric waves between the transceiver and transponder are blocked, and when the tongue plate of the seat belt is inserted the shield plate is moved to permit transmission and reception of electric waves between the transceiver and transponder. A detection that the occupant is wearing the seat belt is therefore obtained. A disadvantage of the disclosed device is that the alternative state where the occupant is not wearing a seat belt is only implicitly indicated. That is, the device only explicitly detects one state. The document infers that each additional state which needs to be explicitly indicated requires at least an additional transponder together with means to distinguish at the transceiver the responses from the transponders.

It is an object of the present invention to improve over the known art by explicitly determining a plurality of physical states using a transponder.

According to the present invention there is provided a radio system for spatial sensing applications comprising:
  a transmitter operable to send a query message;
  a transponder comprising at least one antenna, the transponder being operable to send a response message on receipt of the query message;
  a radio frequency shield which in use is moveably interposable between the transmitter and the at least one antenna, the shield being operable to attenuate the signal strength of the query message prior to being received at the at least one antenna; and
  a receiver operable to receive the response message;
wherein
  when the shield is interposed between the transmitter and the at least one antenna the transponder is operable to receive the query message and the response message comprises data determined according to the signal strength of the query message received at one or more antennas.

Advantageously, unlike the prior art, the query message (radio signal) is received by the transponder even when the shield is interposed between the transmitter and transponder. The invention realizes and exploits the characteristic that an obstruction (radio frequency shield) in the path of a radio signal can reduce the strength of the radio signal received at a receiving antenna, such reduction being variable and predetermined according to the type of shield employed, for example due to its material and/or how much of the path it obstructs. Advantageously, these variations in received signal strength at such a receiving antenna are detected and used to determine the positioning of the shield in relation to the antenna. The shield acts to attenuate the query message such that the applied attenuation (reduced signal strength at an antenna of the transponder) can be discriminated by the transponder whilst also ensuring that sufficient signal strength of the query message reaches one or more antennas of the transponder to ensure reception of the query message. At a particular receiving antenna, the query message may be attenuated to a strength which remains sufficient to allow the transponder to receive the query message using that antenna. Such an arrangement is suitable for a transponder which utilizes only one antenna for receiving the query message. Alternatively, at a particular receiving antenna, the query message may be attenuated to a level which prevents the transponder receiving the query message using that antenna; in this case another antenna of the transponder is used to receive the query message. Clearly, such an arrangement is suitable for a transponder which utilizes a plurality of antennas for receiving the query message. The shield may attenuate the query message received at more than one antenna of the transponder. The transponder explicitly detects the position of the shield by determining the signal strength of the query message as received at one or more antennas. The shield may comprise one or more elements each of which acts to obstruct the radio path to one or more antennas.

The shield may be moveable in one, two or three physical dimensions (degrees of freedom), making the system suitable for the determination of the spatial configuration of a physical object. The shield may comprise part of the object on or within which an antenna of the transponder is mounted, for example, the shield may comprise part of a rotatable shaft on or within which the transponder (and its antenna) is mounted.

The invention supports the use of active or passive transponders. Preferably, passive transponders (such as RFID tags) are used as this allows detection of spatial configuration by the inclusion of suitable passive transponders in difficult to access regions of physical objects, since such transponders require neither physical connections (for power or signals) nor routine maintenance, for example to exchange a battery. Typical applications include use of a suitable passive transponder in a joint of a physical object, which joint can be articulated in two or three physical dimensions. Preferably, such a transponder utilizes a plurality of antennas for receiving the query message, wherein one or more shield elements act to attenuate the query message received at one or more of the antennas. In this way, the transponder can, using the measured signal strength at each respective antenna, generate a response message which reports or otherwise enables a determination to be made of the spatial configuration of the physical object. For example, where the spatial configuration is a steady state, the transponder may compute the state from the available measured signal strength data and the response message may contain data indicating a measured signal strength and/or the computed state. Alternatively, where the spatial configuration state changes continuously or repeatedly, the transponder may report data using a suitable sequence of response messages.

Examples of physical objects which could utilize the system of the invention include switches, machine tools, vehicles, robots and toys. Examples of typical mechanical arrangements which could utilize the system of the invention include a translatable member, a rotatable shaft, a sleeved bearing or joint, a ball and socket joint, a universal joint and the like. Advantageously, the physical configuration of a transponder antenna does not need to be optimized for gain or other RF characteristics; this permits the use of a variety of form factors which can be selected according to the size and shape of a host object. For example, an antenna may be planar for placing on a two dimensional surface or for embedding within a physical object. Likewise, an antenna may be curved for placing on or within a three dimensional object. The size of the antenna is a function of transmitter power, attenuation of a shield and antenna characteristics; individually or in combination, these provide a high degree of flexibility to determine a suitable antenna configuration for a specific application.

The invention allows explicit determination of spatial configuration states of a physical object, typically by using a single transponder; alternatively, multiple transponders may be used. Advantageously, a transponder can be configured, by means of suitable shield elements and/or one or more antennas, to determine the desired spatial configuration states of a physical object, for example to achieve a certain positional resolution and/or other characteristic. The system allows use of passive transponders which in turn can be installed in inaccessible assemblies such as bearings, articulated joints and the like without requiring connections for power supply or signals purposes. Passive transponders can allow a suitable form factor, size and weight for deployment in compact and/or inaccessible physical objects, suitable examples of such transponders include those utilizing RFID technology. Advantageously, the host physical object may at least partially provide shielding for an antenna of the transponder, further simplifying implementation.

Embodiments of the invention will now be described, by way of example only, with reference to the accompanying drawings in which:

FIGS. 1a and 1b are schematic diagrams of a radio system comprising a transponder employing one receive antenna;

FIGS. 2a and 2b are schematic diagrams of a radio system comprising a transponder employing a plurality of receive antennas;

FIGS. 3a and 3b is an example of the system of FIGS. 2a and 2b employing a mercury tilt switch mechanism;

FIGS. 5a and 5b are schematic diagrams of a radio system comprising a transponder built into a sleeved joint or bearing assembly.

Figure 4A:
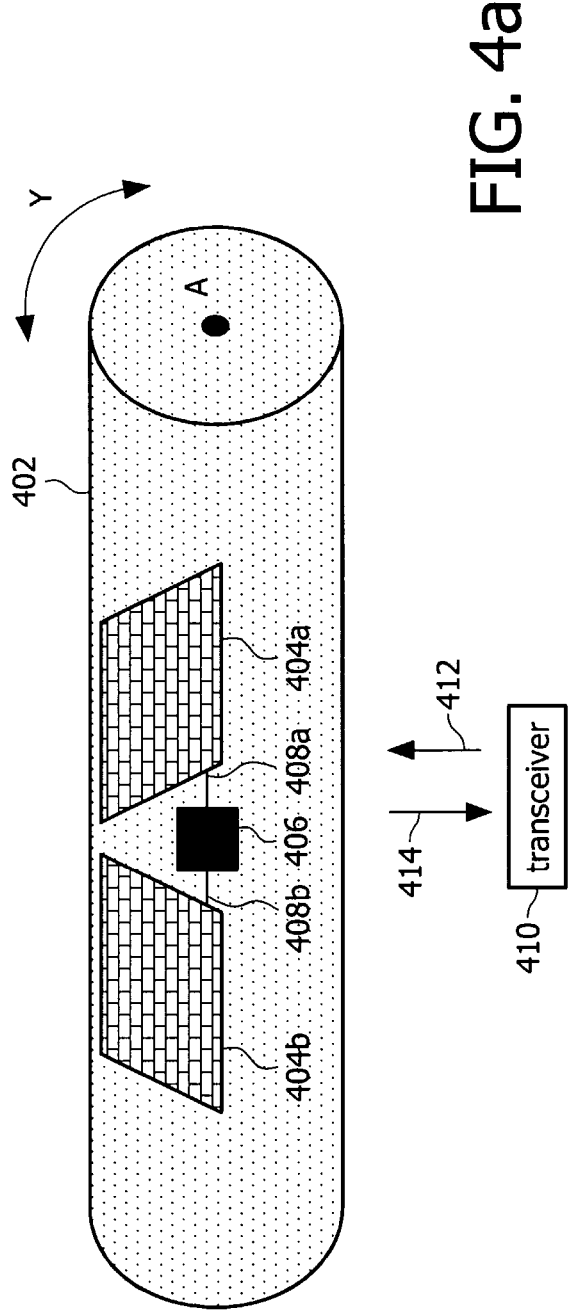
FIGS. 4a and 4b are schematic diagrams of a radio system comprising a transponder with antennas situated within a rotatable shaft.

FIG. 1a shows a radio system comprising a transponder employing one receive antenna. The system comprises a radio transmitter 102 which sends query message 112 to transponder 104; the path of the message is not obstructed by shield 108. The transponder receives query message 112 using antenna 106; in response, the transponder 104 via antenna 106 sends a response message 114 to a receiver 110, the response message comprises data determined according to the signal strength of the query message received at antenna 106. The radio system may utilize either active or passive transponders. An active transponder is powered using power obtained from mains or battery. A passive transponder is powered using RF energy received by its antenna, for example RFID tag technology such as Philips HITAG.

FIG. 1b shows the radio system of FIG. 1a in a different configuration; corresponding elements of the system are identified using the same reference numerals. In this figure, the shield 108 has been moved in the direction of arrow M so as to obstruct the path of query message 112. As a result, a reduced strength query message 112a is received at antenna 106 of transponder 104. The received query message 112a is of sufficient strength to allow decoding of the query message by the transponder 104. In response, the transponder 104 via antenna 106 sends a response message 116 to receiver 110, the response message being different to the case of FIG. 1a in that it comprises data determined according to the reduced signal strength query message 112a received at antenna 106. In the example, the shield 108 has been moved in the direction of arrow M so as to also obstruct the path of the response message 116, resulting in a reduced strength response message 116a received at receiver 110 which is nevertheless of sufficient to allow decoding of the response message 116a by receiver 110. Clearly, the illustrated example is best suited for use with active transponders which have high transmit power for the response message 116. To use passive transponders in the illustrated example, preferably the shield is arranged to reduce the signal strength of received query message 112a by a minimum discernable amount compared to the strength of the original query message 112; another improvement is to arrange for the shield not to obstruct the path of the response message. The transmitter and receiver may also be combined into one transceiver unit.

FIG. 2a shows a radio system comprising a transponder employing a plurality of receive antennas. The system comprises a transceiver 202 which sends a query message 212 received at separate antennas 206, 208 of transponder 204. Referring to FIG. 2b, when the shield 210 is moved in the indicated direction M, the path of query message 212 to antenna 206 is blocked resulting in the query message 212 being received at the transponder only via antenna 208. In general, at least one antenna (206 and/or 208) is able to receive the query message 212. As illustrated in the example, antenna 208 always receives the query message 212 irrespective of the position of the shield. In certain embodiments, a transponder may comprise a main antenna which is designated to always receive the query message (that is, it is never shielded by the shield), the transponder further comprising one or more satellite antennas which are, individually or in combination, selectively shielded by the shield (or shields) according to the requirements of the application. In another implementation, operation of the shield may alternate reception of the query message at one or another antenna, one such example is discussed in relation to FIGS. 3a and 3b below. Referring back to the present example, the response message 214, 216 from the transponder 204 to transceiver 202 comprises data determined according to the signal strength of the query message received at the antennas 206, 208. Note also that an antenna used to receive the query message may be used to send the response message; as is shown, response message 214 is sent using antenna 206 (or 208, not indicated in FIG. 2a) and response message 216 is sent using antenna 208. The system of FIGS. 2a and 2b is equally applicable for use with a separate transmitter and receiver arrangement.

FIGS. 3a and 3b show an example of a radio system employing a mercury tilt switch mechanism. FIG. 3a shows a plan view of the mercury tilt switch mechanism 300 which comprises a cylindrical cavity 306 containing a mercury liquid droplet 308, which droplet is able to move along the cavity as denoted by the double headed arrow M. The external surface of the cavity supports a passive RFID transponder comprising processor 302 which has connections 310a, 310b to respective antennas 304a, 304b. The antennas are arranged such that one or other antenna is obstructed by droplet 308, as the droplet is moved from one end to the other end of the cavity.

FIG. 3b shows a side elevation view of the system incorporating the mercury tilt switch mechanism, corresponding elements of the mechanism are identified using the same reference numerals. In known fashion, by inclining the cylindrical cavity 306 in relation to the horizontal (by rotation in the direction Y about axis A), the mercury liquid droplet moves due to gravitational force along the cylindrical cavity as denoted by double headed arrow M. The system further comprises a transceiver 312 which sends a query message 320 to be received by an antenna of the mercury tilt switch mechanism. As shown in FIG. 3b, antenna 304a is unable to receive the query message since it is shielded by droplet 308; antenna 304b is not shielded and receives the query message. In response, the processor 302 composes and sends, using antenna 304b, a response message 322 comprising data determined according to the signal strength of the query message received at antennas 304a and 304b, thereby indicating to the transceiver the present status of mercury tilt switch mechanism. Clearly, should the mercury tilt switch mechanism be moved to the alternative state where antenna 304b is unable to receive the query message since it is shielded by droplet 308, then antenna 304a is not shielded and receives the query message. In response, the processor 302 composes and sends, using antenna 304a, a response message 322 comprising data determined according to the signal strength of the query message received at antennas 304a and 304b, thereby indicating to the transceiver the new status of mercury tilt switch mechanism. According to the requirements of a particular application, the transceiver sends query messages at suitable time intervals in order to determine the present state of the mercury tilt switch mechanism, for example a suitable time interval might be every 20 seconds for a room thermostat employing such a mechanism. An advantage is that the mercury tilt switch mechanism requires no electrical signal or power connections and is thus galvanically isolated from the system. Furthermore, the positioning, size and shape of the transponder antennas can be selected according to the preference of the designer, since in general the radio system operates at short range such that antenna gain can be less than optimal whilst still ensuring satisfactory communication of messages between transceiver and transponder. In an alternative less preferred embodiment, the mercury tilt switch mechanism could employ a transponder which has only one antenna, the droplet being of a size to either partially shield or not shield the antenna, according to the state of the mechanism. In this case the transponder would be able to receive the query message, but the output power to send the response message could be reduced when the mechanism is in the state where the droplet partially shields the antenna.

Figure 4B:
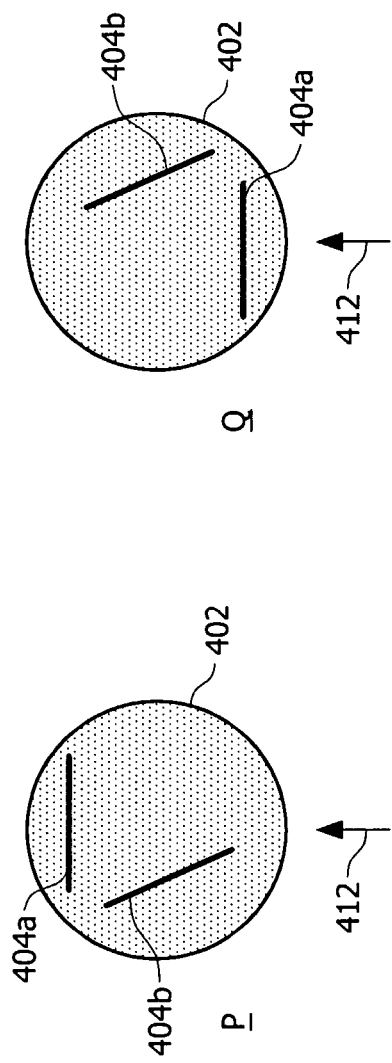

FIGS. 4a and 4b are schematic diagrams of a radio system comprising a transponder with antennas situated within a rotatable shaft. FIG. 4a shows a shaft 402 rotatable Y about its axis A. Embedded within the shaft is a passive RFID transponder comprising a processor 406 which has connections 408a, 408b to respective antennas 404a, 404b. The antennas 404a, 404b are able to receive query messages 412 sent from transceiver 410. FIG. 4b shows two angular positions P, Q of the shaft 402 viewed along its axis A with the transceiver sending query message 412 from beneath the shaft. The shaft acts as RF shielding for the antennas 404a, 404b. RF shielding may be an inherent property of the shaft material, for example where the shaft is made of a suitable metal or alloy. Alternatively where the shaft material is not inherently suitable to act as shielding, shielding material may be embedded within or applied to the surface of the shaft. In the example, the material of the shaft acts as RF shielding for the antennas. Referring to antenna 404a, in position P the amount of shaft material between the transceiver and antenna is much greater than in position Q. The response message 414 sent using antenna 404a comprises data determined according to the signal strength of the query message received at antenna 404a. Therefore, positions P and Q can be determined using antenna 404a, for example by respectively detecting the minimum and maximum signal strength of the query signal received at the transponder. The foregoing discussion assumes receipt of query and response messages 412, 414 of sufficient strength to allow decoding by the transponder and transceiver respectively, as discussed earlier in relation to FIGS. 1a and 1b. The optional antenna 404b provides additional means for communication between the transponder and transceiver. The orientation of antenna 404b in relation to antenna 404a may allow additional angular positions and/or the direction of the rotation of the shaft 402 to be determined, using techniques known to the skilled person in the art.

FIGS. 5a and 5b are schematic diagrams of a radio system comprising a transponder built into a sleeved joint or bearing assembly. FIG. 5a shows a perspective view of the assembly 500 comprising a shaft 502 with axis A and a sleeve 506 mounted coaxially with respect to shaft 502, the sleeve and shaft being moveable in relation to each other by rotation about axis A and translation along axis A, as denoted by Y and M respectively. Optionally, the shaft and sleeve are connected to members of a physical object 504, 508, for example limbs of a robot. A passive transponder is built into the shaft and comprises four antennas 510a, 510b, 510c, 510d mounted at suitable locations on the surface of the shaft. The sleeve 506 contains a RF shield 512 located in a portion of its surface and suitably positioned with respect to the antennas. A transceiver 518 external to the assembly sends a query message 514 to the transponder; and, in response to receipt of the query message, the transponder sends a response message 516 comprising data determined according to the signal strength of the query message received at one or more of the antennas 510a, 510b, 510c, 510d. FIG. 5b shows a view of the assembly along the axis A and shows query message 514. Referring to FIG. 5a and FIG. 5b, the relative position of the sleeve and shaft as depicted is such that the shield does not obstruct any of the antennas, and data in the response message 516 will represent this state. Subsequently, according to the illustrated arrangement of antennas 510a, 510b, 510c, 510d and shield 512, should the relative position of the sleeve and shaft change due to rotation and/or translation, and data in the response message 516 will represent this new state in that at least one antenna will be partially obscured by the shield thereby reducing the signal strength of the query message received at that antenna.

The embodiment of FIG. 5 can be extended to other shapes such as planar, conical or spherical arrangements typically found in bearings or joints. Various arrangements of antennas and shielding are also possible including a shield made of discrete elements each addressing a portion of an antenna. Any number and/or shapes of antennas may be suitably arranged so as to receive the query signal and/or monitor the relative motion of the assembly, joint or bearing.

The foregoing implementations are presented by way of examples only and represent a selection of a range of implementations that can readily be identified by a person skilled in the art to exploit the advantages of the present invention.

In the description above and with reference to FIGS. 1a and 1b, there is provided a radio system for sensing the spatial configuration of a, physical object comprising a transmitter 102 which sends a query message to a transponder 104 having at least one antenna 106. A radio frequency shield 108 is moveably interposable between the transmitter and one or more antennas and thereby attenuates the signal strength of the query message received at an antenna. In any state of spatial configuration of the physical object, the transponder is able to receive the query message and, in reply, send a response message containing data determined according to the signal strength of the query message received at the one or more antennas.

The invention claimed is:

1. A radio system for spatial sensing applications, comprising:
   a transmitter operable to send a query message;
   a transponder comprising at least one antenna, the transponder being operable to send a response message on receipt of the query message;
   a radio frequency shield moveably interposable between the transmitter and the at least one antenna, the shield being operable to attenuate the signal strength of the query message prior to being received at the at least one antenna; and
   a receiver operable to receive the response message;
   wherein the transponder is operable to receive the query message while the shield is interposed between the transmitter and the at least one antenna of the transponder, and
   wherein the response message sent by the transponder comprises data determined according to the signal strength of the query message received at one or more antennas while the shield is interposed between the transmitter and the at least one antenna of the transponder, the data conveying information indicative of relative spatial positioning of the at least one antenna of the transponder and the radio frequency shield.

2. The system as claimed in claim 1, wherein the system is arranged to cooperate with a physical object, the physical object comprising a first member which supports the transponder.

3. The system as claimed in claim 2, wherein a transponder antenna is situated on a surface of the first member.

4. The system as claimed in claim 2, wherein a transponder antenna is embedded within the body of the first member.

5. The system as claimed in claim 2, wherein the physical object further comprises a second member, operable to be moveable in relation to the first member, that supports the shield.

6. The system as claimed in claim 5 wherein the transponder comprises a plurality of antennas arranged in relation to the shield such that the response message data enables the determination of the relative position of the first and second members.

7. The system according to claim 5, wherein a tilt sensor is provided for use in the system, and wherein the first member comprises a sealed cylindrical cavity containing the second member comprising a liquid droplet moveable due to gravitational force along the axis of the cylindrical cavity by inclining the cylindrical cavity in relation to a horizontal axis, wherein the at least one antenna is arranged on the surface of the cylindrical member and the liquid droplet provides radio frequency shielding of said antenna at a pre-determined inclination of the cylindrical cavity.

8. The system as claimed in claim 2, wherein the first member supports the shield.

9. The system as claimed in claim 2, wherein the first member is planar.

10. The system as claimed in claim 2, wherein the first member is cylindrical.

11. The system as claimed in claim 2, wherein the first member is spherical.

12. The system according to claim 1, wherein a transponder is provided for use in the system, the transponder comprising an RFID tag.

* * * * *

UNITED STATES PATENT AND TRADEMARK OFFICE
CERTIFICATE OF CORRECTION

PATENT NO. : 8,493,180 B2
APPLICATION NO. : 11/568632
DATED : July 23, 2013
INVENTOR(S) : Wilhelmus F. J. Fontijn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1909 days.

Signed and Sealed this
Eighth Day of September, 2015

Michelle K. Lee
*Director of the United States Patent and Trademark Office*